INVENTORS
FRANK D. WERNER
RAJABUSHANAM SATHYAKUMAR
BY
Dugger, Bullock, Johnson & Westman
ATTORNEYS March 18, 1969   F. D. WERNER ET AL   3,433,068

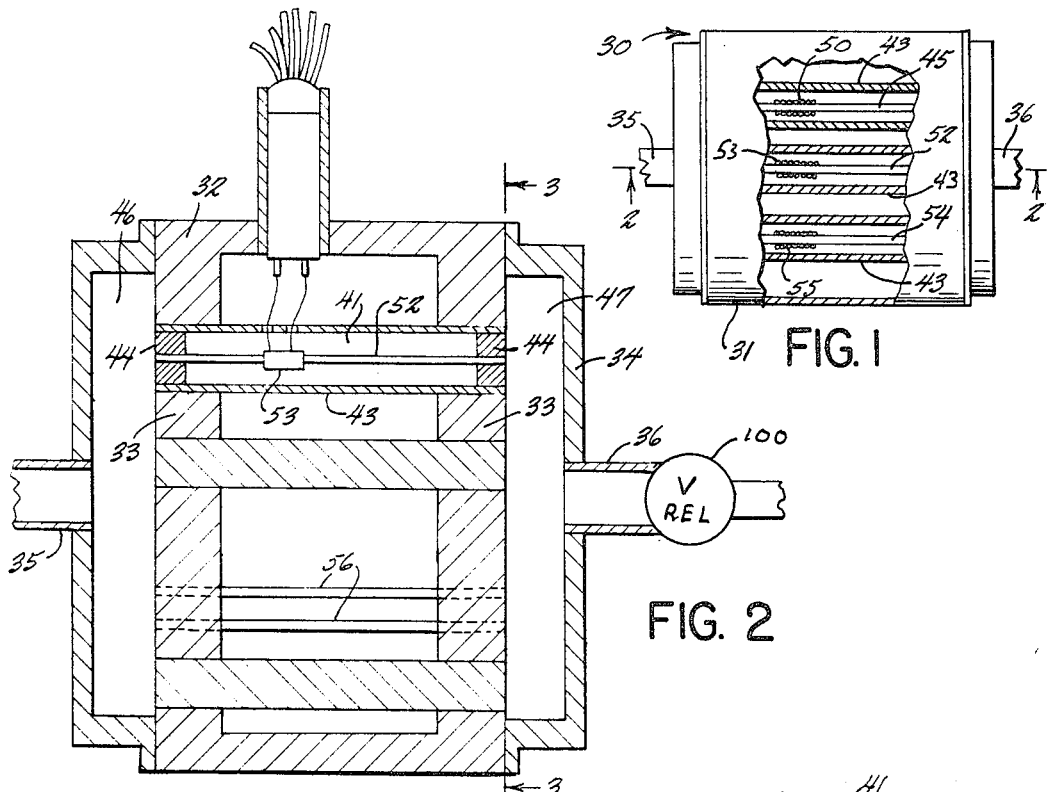
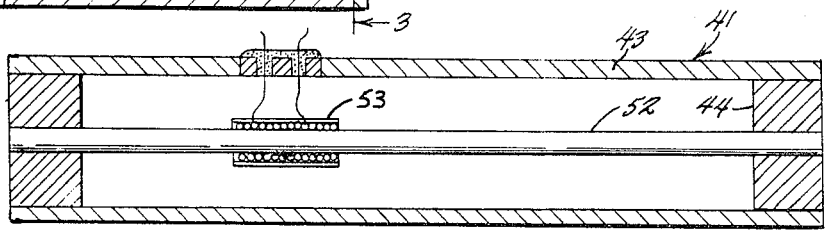
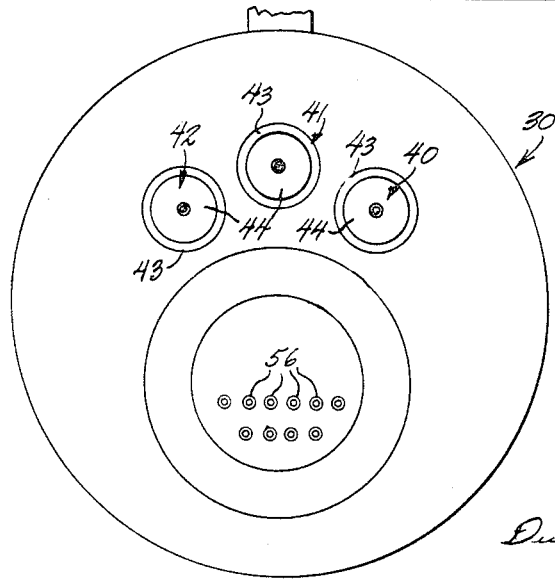

THERMAL MASS FLOW SENSOR

Filed Nov. 12, 1964   Sheet 4 of 4

INVENTORS
FRANK D. WERNER
RAJABUSHANAM SATHYAKUMAR
BY
Dugger, Bulloch, Johnson & Westman
ATTORNEYS

United States Patent Office 3,433,068
Patented Mar. 18, 1969

3,433,068
THERMAL MASS FLOW SENSOR
Frank D. Werner and Rajabushanam Sathyakumar, Minneapolis, Minn., assignors to Rosemount Engineering Company, Minneapolis, Minn., a corporation of Minnesota
Filed Nov. 12, 1964, Ser. No. 410,602
U.S. Cl. 73—204                13 Claims
Int. Cl. G01f 1/00, 23/24

ABSTRACT OF THE DISCLOSURE

A mass flow sensor having at least one tubular element of small diameter in the path of flow. The tube is open to permit flow therethrough and another similar tube is blocked and also placed in the path of flow. Self-heating temperature-responsive resistance elements are placed on each of the tubes in good heat conducting relationship to the tubes and these resistance elements are connected into a bridge circuit. When fluid flows through the housing and passes through the open sensing tube, heat from the resistance element on that tube is convected to the fluid. This causes a reduction in temperature in the open sensing tube as compared to the closed tube. The resistance element on the open tube changes in resistance with the change in temperature causing a bridge unbalance which gives an output signal proportional to the reduction of temperature. The greater the flow, the greater the change in resistance of the resistance element on the open tube as compared to the plugged tube. By proper calibration an indication of the mass flow through the sensor can be obtained.

---

The present invention has relation to mass flow sensors and more particularly to a mass flow sensor which uses two sensing elements, one of which changes temperature when the sensor is subjected to fluid flow, and compares the temperature change between the sensing elements in order to determine the amount of flow through the one element.

In the prior art, many different types of flow sensors have been advanced. Some of these utilize a pair of temperature sensors longitudinally spaced on a conduit in which fluid is flowing with a heater coil positioned between the sensor. With flow through the conduit and the heater coil operating, there will be a temperature gradient between the upstream and downstream sensors. In order to maintain the same temperature differential at different flows, the amount of heat dissipated by the heater will have to be changed. By proper calibration the electrical requirements of the heater can be used to indicate the flow.

These sensors require very careful calibration and have a considerable time delay between a change in flow and an indicated response. Multiple components usually used means more expensive and complex to build. These factors make the flow sensors undesirable.

Further, other sensors have utilized separate temperature sensing elements and heaters suspended in a conduit. The temperature differential between the two sensors caused by fluid flow is utilized to indicate fluid flow. This type of sensor interferes with fluid flow and the meter is not accurate as a result.

To overcome these problems, the device of the present invention, as shown, presents a mass flow sensor which has at least one tubular element of small diameter in the path of flow. The tube is open to permit flow therethrough and another similar tube is blocked so that no flow will pass through the tube. As shown, temperature-responsive resistance elements are placed on the tubes in good heat conducting relationship to the tube and these resistance elements are connected into a bridge circuit. The resistance elements act as heaters and temperature sensors and heat the tubes equally. When fluid flows through the sensor and passes through the open sensing tube, heat from the resistance element on that tube is convected to the fluid. This will cause a reduction in temperature in the open sensing tube as compared to the closed tube. The resistance element changes resistance with a change in temperature and causes a bridge unbalance which gives an output signal proportional to the reduction of temperature of the resistance element. The greater the flow, the greater the change in resistance of the resistance element as compared to the resistance element on the tube which is plugged or insensitive to the flow. By proper instrumentation the change of resistance is used to indicate the flow through the sensing tube.

It is important that the flow through the active sensing tube is laminar and small so that the flow-temperature characteristics of the fluid are predictable and are repeatable. The fluid is heated throughout the cross sectional area of the tube opening. As a result of proper use of the above factors the transfer of heat to the fluid is a function of the thermal mass flow rate ($C_p\rho V$) and does not involve other flow parameters. In the above formula $C_p$ is the specific heat of the medium being measured; $\rho$ (rho) is the density and V is the volumetric flow rate of the medium. In order to make sensors usuable for high fluid flows, bypass tubes are provided in the sensor. In the present invention, the bypass tubes are constructed identical in shape and size to the sensing tube so that the proportion of flow through the sensing tube as compared to the bypass tubes is the same under all conditions of flow.

Other variations of the sensors are shown. Among them, is a device using a mass flow sensor for determining the amount of leakage from a storage tank. Also, a bellows or overpressure relief valve is utilized in the outlet of a sensor in one form of the invention to keep the pressure within the sensor above the minimum amount at which liquids being measured will change to gasses in order to eliminate the heat of vaporization effects on the sensor. This type of device works well where checking the flows of liquid oxygen or nitrogen or petroleum fuels such as RP-1 at high ambient temperatures.

Another modification discloses two flow sensitive elements in series to increase the signal output. Therefore, it is an object of the present invention to present a thermal mass flow sensor which has a heated sensing element, which will pass fluid and the temperature of this element is compared with an element which will not pass fluid but is otherwise identical in construction and identically heated.

It is a further object of the present invention to present a flow meter wherein the element is heated with resistance elements that have the dual purpose of heating and sensing temperature.

It is another object of the invention to present a mass flow sensor in which the sensing element tube is small and the entire sample of fluid which passes through the sensing tube has a temperature rise as it passes through the sensing element tube, and thermal equilibrium between the tube and the fluid is substantially attained.

It is a still further object of the present invention to present a thermal mass flow meter which utilizes a plurality of bypass tubes constructed identically to the sensing element, in order to accommodate substantial flows of fluids and still have laminar flow in the sensing element.

Another object is to provide a sensor with a sensing element to slightly control the voltage passing through the resistance on the other elements to compensate the sensor characteristic throughout a wide range of operating temperatures.

Other objects include provision of a valve in the outlet of the sensor to keep the pressure in the sensor above a minimum; and to place convective shields around the element to minimize attitude, or position sensitivity.

Other objects of this invention will be apparent as the description proceeds.

In the drawings:

FIG. 1 is a top plan view of a thermal mass flow sensor made according to the present invention;

FIG. 2 is a sectional view taken as on line 2—2 in FIG. 1;

FIG. 3 is a sectional view taken as on line 3—3 in FIG. 2;

FIG. 4 is an enlarged vertical sectional view of a sensing tube of the device of FIG. 1;

Figure 5:
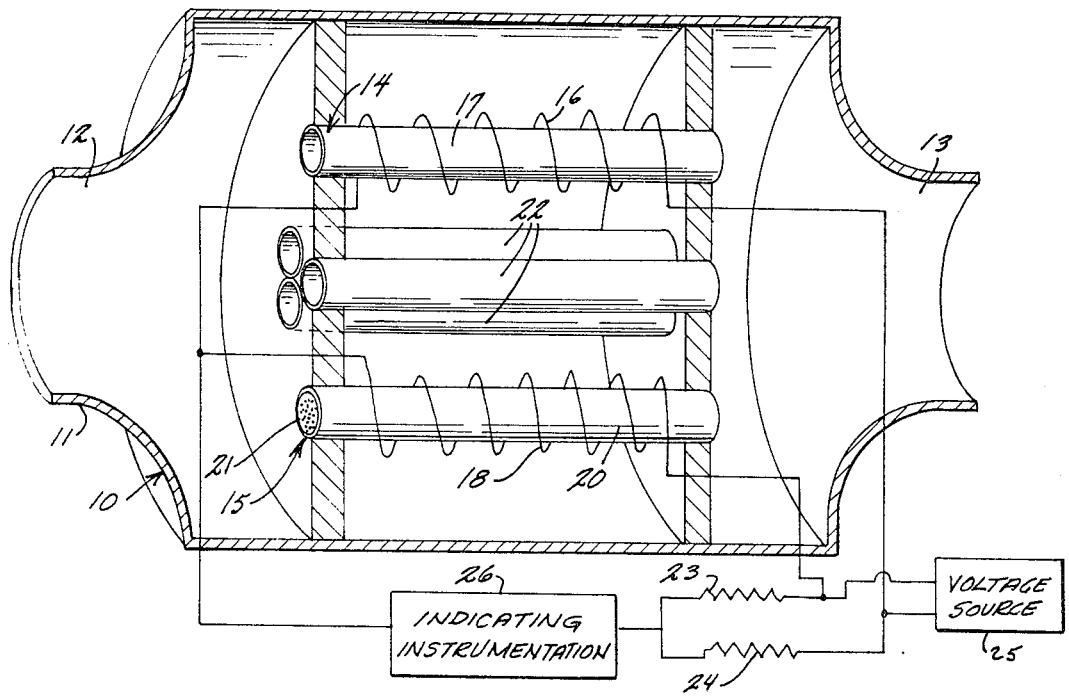
FIG. 5 is a schematic representation of a mass flow sensor made according to the present invention illustrating the bypass tubes utilized with the sensor.

Referring to the drawings, corresponding numerals will refer to the same parts throughout the specification. First, referring particularly to FIG. 5, the concept of thermal mass flow sensors made according to the present invention is shown. The sensor 10 includes an outer case 11 which has an inlet opening 12 and an outlet opening 13. Fluid flows in the inlet and out the outlet. In order to measure this flow, the core of the sensor, which is shown only schematically in this view, includes a flow-sensitive element 14 and a flow-insensitive or dummy element 15, both of which are identically constructed and both have resistance elements which are made of material that changes resistance with a change in temperature wrapped around the outer periphery thereof and electrically insulated from but in good thermal conductivity therewith. The flow sensitive element has a self-heating temperature-sensitive resistance element 16 and the flow insensitive element has a self-heating temperature-sensitive resistance element 18 thereon. While, as shown, wire is used, the resistance elements 16 and 18 can be any suitable configuration which will serve a dual function explained more fully later. The resistance elements are identically constructed as well and preferably are made of platinum or a similar metal that changes resistance greatly upon a change in temperature and has high accuracy and stability under a wide range of temperature.

The flow-sensitive element in the usual case, and as illustrated, is comprised of a very small diameter tube 17 which is open to fluid flow. Fluid flowing from the inlet to the outlet enters the end of the tube 17 adjacent the inlet and passes out through the end of the tube 17 adjacent the outlet. The outer case contains bulk heads as shown which serve two purposes, one as a heat sink for the elements 14 and 15 to insure that the tube ends on both elements are at the same reference temperature and the other is to insure that the fluid passes through the open tubes.

The flow-insensitive or dummy element 15 is comprised of a tube 20 which is plugged at its forward end 21 so that no fluid will flow through this tube. The tube 20, which is very small, could be plugged at both ends if desired. In addition, a plurality of bypass tubes 22 are provided so that the fluid flow being measured can be large and yet the flow through the sensing element 14 will be laminar in order to eliminate changing and unpredictable boundary layer effects which have less predictable thermal characteristics.

The sensing elements 14 and 15 are identical in construction, shape, size of resistance elements thereon, and in all other ways, except that the flow insensitive element 15 is plugged to prevent fluid from flowing through the tube 20.

As shown, the resistance elements 16 and 18, respectively, are connected as arms in a bridge circuit with a pair of balancing resistors 23 and 24. A fixed voltage is supplied through a source of EMF 25 (this can be the Zener diode voltage source or other suitable controlled voltage) and this voltage results in current flowing through the bridge. The amount of current flowing through the bridge determines the heat dissipated by the resistance elements 16 and 18. There will be no indicated output at terminals 26 as long as the resistors 23 and 24 are balanced and the resistance elements 16 and 18 are balanced. However, the current flow through the resistance elements 16 and 18 will cause them to self-heat and to heat the tubes 17 and 20, respectively. Thus the bridge serves as electrical means to heat the resistance elements.

When there is no flow through the sensor, the two resistance elements would respond alike and the bridge would be balanced (the heat sink will control the temperature of the tube ends). All heat from the resistance elements is conducted to the heat sinks. Therefore, there would be no output appearing at terminal 26.

When flow is introduced into the sensor the fluid will enter the inlet 12, pass through the flow-sensitive element 14 (actually pass through tube 17) and part of the flow will go through the bypass tubes. Use of these bypass tubes is to insure that the flow through the tube 17 will be laminar.

The fluid flowing through the element 14 will absorb heat from the tube 17 through forced convection. This will cause cooling of resistance element 16. The resistance element 16, being constructed of material which changes resistance with temperature changes (such as platinum), will change in resistance. This will cause bridge unbalance inasmuch as there is no fluid flow through the element 15 and the temperature of tube 20 remains the same and resistance element 18 will not change in resistance. This bridge unbalance will in turn result in a signal appearing at the output or indicating instrument 26. The magnitude of the signal appearing at instrument 26 is dependent upon the amount of change in resistance of the resistance element 16, which in turn is dependent upon the amount of heat loss and this heat loss is dependent on the fluid flow through the tube 17. The output of the bridge circuit serves as a temperature comparison between the resistance elements. The output signal appearing at the instrument 26 is also a function of the flow through tube 17 and the indicating instrument may directly indicate the thermal mass flow through the sensor.

Referring specifically now to FIGS. 1–3, a typical thermal mass flow sensor made according to the present invention is illustrated. The sensor 30 includes an outer case 31 which, as shown, is cylindrical. The case includes a center main body portion 32 that has bulk heads 33, 33 fixed at opposite ends thereof. A pair of end caps 34, 34 are attached to the center portion 32 and define open chambers at each end of the center portion. An inlet conduit 35 is open to an inlet chamber 46 of the sensor and leads from a source of fluid under pressure. An outlet conduit 36 is open from an outlet chamber 47 defined by the opposite end cap.

The sensor 30 is provided with a first control element 40, a second sensing element 41 and a dummy or flow-insensitive element 42. Each of these elements is mounted between and supported by the bulk heads 33, 33 and includes an outer tubular convection shield 43 which is fixedly attached to the bulk head and which has a pair of drum head end members 44 attached thereto at opposite ends thereof. The drum end members in turn are used to support a small tube.

In control element 40, a tube 45 is supported in the two shield drum heads and is closed at the inlet end so that it will not permit fluid to pass from the inlet chamber 46 to the outlet chamber 47 of the sensor. A resistance element 50 is mounted on the tube 45 (and electrically insulated therefrom) and has suitable leads leading to electrical connections. This resistance element 50 is actually a resistance thermometer element.

The sensing element 41 is constructed substantially identically to the control element 40 and includes the outer tubular convective shield 43 and an open sensor tube 52 mounted in the drum ends 44. The tube 52 is open from the inlet chamber 46 to the outlet chamber 47. A separate self-heating temperature sensitive-resistance element 53 which changes resistance with a change in temperature is also wrapped around the tube 52 of the element 41 and suitable leads are provided for connecting this resistance element into a bridge circuit. The resistance element 53 is electrically insulated from the tube but is in good heat conducting relationship thereto.

The dummy element 42 is constructed like the element 40 and includes the outer convective shield 43, the drum heads 44 and a center tube 54. The tube member 54 is sealed at the inlet end so that no fluid can flow therethrough.

The tube 54 of dummy element 42 has a self-heating temperature-sensitive resistance element 55 mounted thereon. The resistance element 55 is identical to the resistance element 53 and is in the same position on its tube. Suitable leads are provide to connect the resistance element 55 in circuit. Note that the resistance elements 53 and 55 are mounted adjacent the inlet end of the tubes.

It will be noted that the elements 40, 41 and 42 are all identically mounted and all are the same shape, size and physical arrangement. The elements 40 and 42, as previously stated, are sealed so that no fluid will flow through the center tubes thereof, but other than this the elements are identically constructed and will be under substantially identical environmental conditions except for fluid flow. The elements 41 and 42 are mounted in the bulk heads which act as heat sinks to insure that the tube ends of the two elements are at the same reference temperature. The heat sinks are massive enough to equalize the temperature of these tubes adjacent their ends.

In addition to the elements described above, a plurality of bypass tubes illustrated generally at 56 are mounted in the bulk heads 33, 33. The bypass tubes 56 are open to permit fluid to flow therethrough from the inlet of the flow sensor to the outlet of the sensor. These bypass tubes 56 are identically constructed to the tube 52. They have the same size, diameter, length, shape, the flow of any particular fluid passing through the sensor will be identical in each one of the bypass tubes and the same as the flow passing through the tube 52 in the sensing element 41. The proportion of the flow passing through the sensing element is the same for any type of fluid at any velocity or rate of flow of the fluid. Therefore, calibration will remain stable at all rates of flow within the limits of the sensor and for all fluids. As shown, there are ten bypass tubes in the unit, but any reasonable number desired can be used.

Figure 3A:
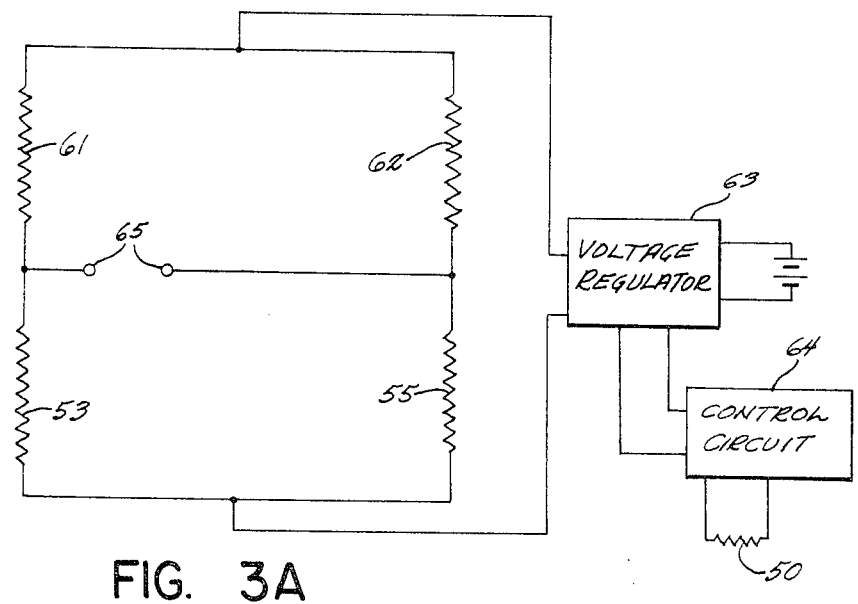
FIG. 3A is a schematic representation of a circuit used with the sensor of FIG. 1.

In FIG. 3A is a simplified schematic representation of a typical circuit used with the sensor shown in FIGS. 1–3. The resistance element 53 and the resistance element 55 are used as two arms of a bridge circuit and balancing resistors 61 and 62 are used as the other arms. A voltage or EMF is applied to the bridge from a voltage regulator 63. The amount of voltage is controlled by a control circuit 64, which in turn, is responsive to the resistance element 50 which acts as a temperature sensor. Resistance element 50, being subjected to the same temperatures as the other elements 41 and 42, changes resistance with a change in temperature and this is used as a support to control the voltage level on the bridge input.

The reason for controlling the voltage on the bridge input is to compensate for changes in the output of the sensor under wide temperature ranges. The control resistor 50 is used so that when the operating temperature drops or raises significantly the control circuit will cause the required increase or decrease in the voltage on the bridge to cause a correct output signal to be given for the flow being measured.

The sensing element 41, which permits fluid flow through the tube 52, is sensitive to fluid flow through the unit while the dummy element is not affected by fluid flow through the unit. Therefore, if fluid is flowing through the sensor and through the tube 52 of the sensing element 41, heat will be lost to the fluid flowing through this tube by forced convection. This results in a drop in the temperature of the resistance element 53 and a resistance change causing a bridge unbalance and an output signal to appear across the output terminals 65 of the bridge. By calibration this output signal can be correlated to the amount of fluid flowing through the tube 52 and in turn correlated to the total fluid flow through the sensor. The instrument used can be direct indicating. The bridge circuit again heats the resistance elements and compares the temperature between these same elements. (The resistance of the elements is a function of temperature.)

With the resistance elements positioned adjacent the inlet end of the sensor, the time lag between a change of flow and an indication of this change is greatly reduced.

Under no-flow circumstances the heat dissipated by the resistance elements 53 and 55 will be conducted in an identical manner to the bulk heads supporting these tubes. In order to have conductive cooling only under no flow, it is important that the free convective effect of the small tubes 52 and 54 is minimized. A convective shield is used around each of the tubes. As can be seen in FIG. 4, the convective shield 43 is spaced outwardly from and surrounds the small tube, as shown typically, tube 52 of the sensing element 41. The convective effect from the tube 52 becomes negligible when the diameter of the tube 52 is less than one quarter of an inch smaller than the diameter of the tubular convective shield 43. This ratio is maintained in order to minimize the free convective effect and resultant heat loss from the small tube 45. The loss from these tubes 45 is thus by conduction only. The drawings are greatly enlarged to show the construction. Without the shield, the amount of heat loss from tubes 52 and 54 can vary greatly depending upon the orientation of the tube axis. The use of the convective shields make the sensor usable in any position without affecting calibration or performance.

Figure 6:
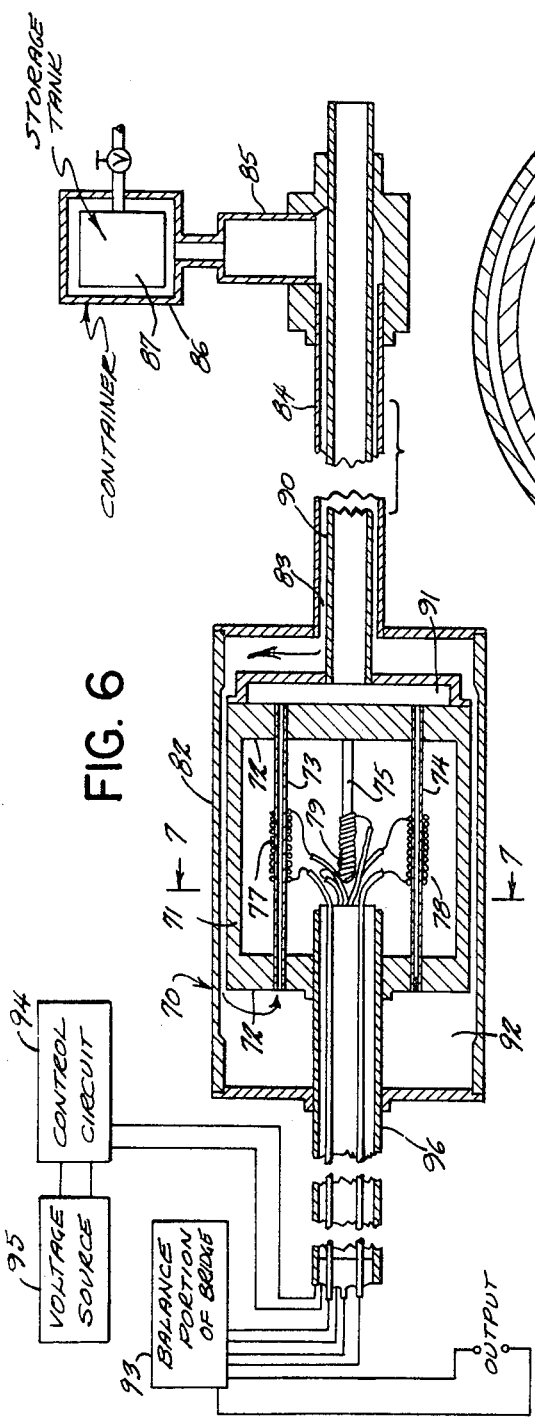
FIG. 6 is a vertical sectional view of a modified form of the invention showing a thermal mass flow sensor constructed specifically for measuring the flow of extremely hot or cold fluids.
Figure 7:
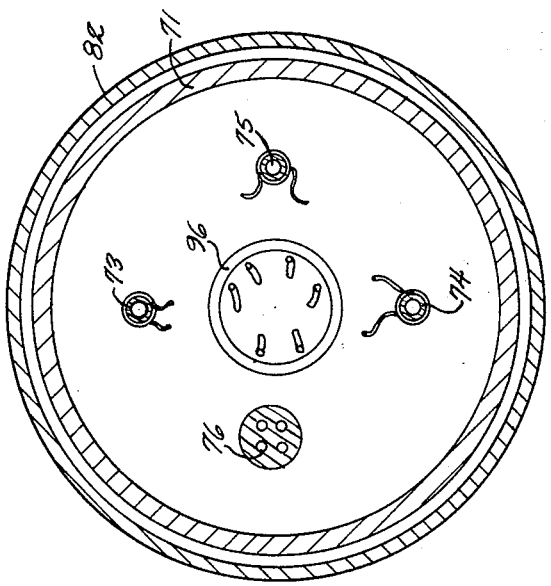
FIG. 7 is a sectional view taken as on line 7—7 in FIG. 6.

In FIGS. 6 and 7, there is shown in cross section a flow sensor constructed according to the present invention with the addition of a heat exchanger for either raising the temperature of the fluid being measured or lowering the temperature of the fluid being measured, if the fluid is extremely hot, before it reaches the sensor itself.

Basically, the sensor 70 has an inner case 71 having bulk heads 72, 72 at opposite ends thereof. In addition, the inner case supports a control tube 73, a dummy tube 74 and a fluid flow-sensitive sensing tube 75. Further, as can be seen in FIG. 7, the inner case 71 can have bypass tubes 76 as desired and for the purposes previously explained.

The control tube 73 has a temperature-sensing resistance element 77 thereon; the dummy tube 74 has a self-heating, temperature-responsive resistance element 78 thereon and the sensing tube 75 has a self-heating temperature-responsive resistance element 79 thereon. These resistance elements are utilized in the same manner as previously explained in connection with the other fluid sensors. It will be noted that the dummy tube 74 is plugged at the inlet end of the inner case 71 so that no fluid will flow through this tube. The tube 75 is open so that fluid will flow through it from the inlet to the outlet. The control tube can be either closed or open and does not have to be self-heating.

The inner case 71 is supported within an outer housing 82. The case 71 is supported so that it is spaced from the housing around the majority of its periphery. The housing 82 has an inlet opening 83 to which a long conduit 84 is attached. The conduit 84 in turn is open to a source of the fluid to be measured. A conduit 85 can be connected to a large container 86 in which a storage tank 87 is retained. The sensor can then sense the amount of leakage from the storage tank 87 by measuring the fluid flowing through the conduit 85 to the housing 82.

Concentric with and sealed from the inlet conduit 84 is an outlet conduit 90. The outlet conduit 90 is open into an outlet chamber 91 at one end of the case. Thus, fluid flowing from the storage tank 87 is caught in the container 86 and passes into the inlet conduit 85, through the conduit 84 (the space around conduit 90) into the inlet opening 83 of the housing 82. There the fluid flows adjacent the outer wall of the housing 82 past the case 71 and into an inlet chamber 92. From there, the fluid will flow through the bypass tubes 76 and through the sensing tube 75 into the outlet chamber 81 and thus back out through the outlet conduit 90 to be discharged as desired.

Conduit 84 is extremely long and usually is wrapped around the sensor so that the fluid coming through the inlet 85 will travel a considerable distance in order to be cooled or warmed, whichever is necessary, before it passes through the sensor.

Further, the cooled fluid passing through the conduit 90 as it is discharged further aids in cooling or heating the fluid being introduced. Thus, there is a double action in the heat exchanger through heat losses from the conduit and also by heat exchange between the incoming fluid and the discharged fluid.

The sensor works in exactly the same manner as previously described utilizing a bridge circuit for the resistance elements 78 and 79 together with a balance portion of the bridge illustrated schematically at 93. Further, the resistance element 77 is utilized through a control circuit 94 to control the amount of voltage on the input of the bridge coming from a voltage regulator. This, in turn, will compensate the bridge output for greatly differing operating temperatures.

It can be seen that the tube 74 is plugged only at its inlet end as shown. The tube 75, of course, is open. The tube 73 can be open or closed. When fluid passes through the sensor, heat being dissipated by resistance element 79 on tube 75 will be absorbed by forced convection in the fluid passing therethrough and the resistance in resistance element 79 will change causing the bridge unbalance and in turn causing an output signal that is calibrated to indicate the flow through the sensor. The bridge circuit provides electrical means to heat the resistance elements and compare their temperatures.

Leaving the one end of tubes 73 and 74 open at the output chamber 91 subjects all of the tubes to the same type of environmental factors so that if there is an aging effect because of the fluid in which the sensor is used, all of the tubes will be subjected to the same condition.

The dummy tube can be plugged at both ends, if desired. With the extremely small diameter tubes used (to insure laminar flow in the open tube) the amount of heat conducted by the fluid in the dummy tube is negligible, as compared to the heat conducted by the tube itself. Therefore whether the dummy has fluid in it during use (the open tube would have fluid in it) does not significantly affect the accuracy of the sensor. If the tubes were large, this could be a factor and then the dummy would have to be filled with the fluid being measured.

The leads and control members for the sensor 70 pass out through the case 71 and housing 82 through a suitable conduit 96. This conduit, of course, is sealed to prevent uncontrolled environmental factors from affecting the operation of the sensor.

Figure 8:
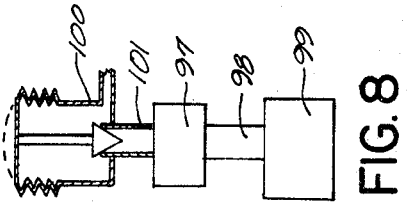
FIG. 8 is a schematic representation of a typical sensor having a relief valve on its outlet.

A further modification is also shown schematically in FIG. 8. This modification can be applied to any of the sensors utilized. A flow sensor 97 is connected to a conduit 98 leading from a source of fluid 99. The sensor is used to measure flow in the conduit 99. As shown, an overpressure relief valve 100 inserted therein into the outer end of an outlet conduit 101. The valve 100 can be any type of relief valve which is suitable, for example, a bellows valve. The pressure at which this valve 100 will open to permit fluid to escape can be set at any desired level. The valve is used where the flow of extremely cold fluids is being measured in liquid form (for example, liquid oxygen or nitrogen). The liquids will change to a gas if the pressure in the sensor is not maintained at an extremely high level. As soon as the liquid changes to a gas, the heat of vaporization of that liquid will cause an erroneous indicating by the sensor because the fluid absorbs heat without a change in temperature as it changes state. Therefore, to insure that the fluid from source 99 remains in its liquid state, the pressure valve 100 can be set so that the pressure inside the sensor 97 remains above the desired level at all times and the heat of vaporization will not affect it. When the pressure is higher than necessary, the valve 100 will open and permit part of the fluid to escape, causing a flow through the sensor 97. Thus, a true measurement of fluid flow is still obtained even though the pressure in the sensor itself is quite high.

As stated before, any of the sensors previously described can be used satisfactorily (see FIG. 2).

Figure 9:
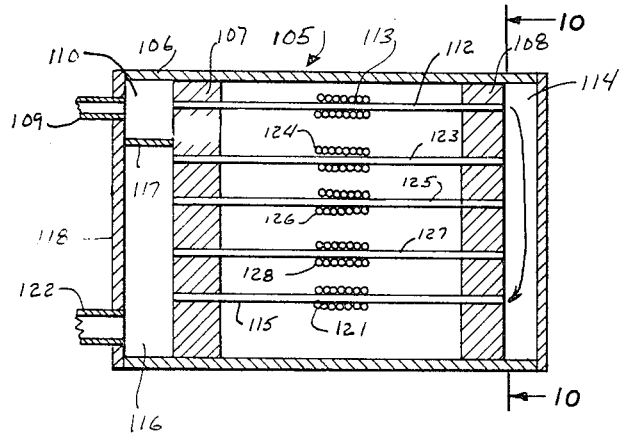
FIG. 9 is a longitudinal sectional view of a modified sensor of the present invention using two open tube elements in series to increase the output signal.
Figure 10:
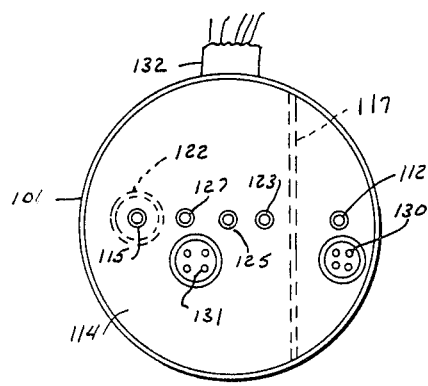
FIG. 10 is a sectional view taken as on line 10—10 in FIG. 9.
Figure 11:
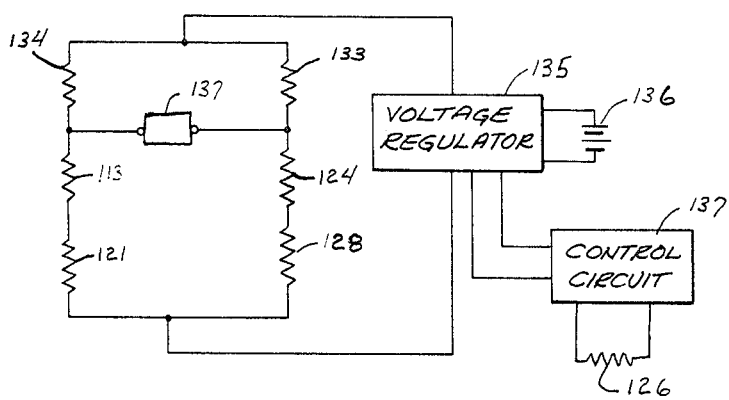
FIG. 11 is a schematic representation of the circuit used with the device of FIG. 9.

Referring to FIGS. 9 through 11, a third form of the invention is shown. In this form, a sensor 105 includes an outer case 106 which has a pair of bulk heads 107 and 108 mounted therein. An inlet conduit 109 leads into an inlet chamber 110 at a first end of the sensor. An open small diameter tube 112 is mounted in the bulk heads 107 and 108 and is open to the inlet chamber 110. The tube 112 is a flow-sensitive tube having a self-heating temperature-sensitive resistance element 113 wrapped around it. The resistance element 113 is electrically insulated from the tube 112 and is in good heat conducting relationship to the tube. The tube 112 is open to a transfer chamber 114 at a second end of the sensor. A second flow sensing or open tube 115 is also mounted in the bulk heads 107 and 108 opposite the tube 112. The tube 115 is open to the transfer chamber 114 at a first end thereof and is open to an outlet chamber 116 at a second end thereof. The outlet chamber 116 is adjacent the first end of the tube and is divided from the inlet chamber 110 by a baffle 117 which is fastened to the bulk head 107 and to an end wall 118 of the case. A self-heating temperature-sensitive resistance element 121 is mounted onto the tube 115 and is electrically insulated therefrom and is in good heat conducting relationship thereto. An outlet conduit 122 is open to the outlet chmaber 116 and permits discharge of fluid from the outlet chamber.

The flow of fluid through this sensor 105 is thus through the conduit 109 into the chamber 110 and through the tube 112 into the transfer chamber 114. Then the flow will go into tube 115 and into the outlet chamber 116 and out through the outlet conduit 122.

A first dummy element or tube 123 is mounted in the bulk heads 107 and 108 in the identical manner to the flow-sensitive or open tubes 112 and 115. The dummy tube 123 has a resistance element 124 mounted thereon in electrically insulated relationship and good heat conducting relationship thereto.

A control tube 125 is also mounted in the bulk heads 107 and 108 and has a temperature-sensing resistance element 126 mounted thereon in electrically insulated relationship thereo. A second dummy element or tube 127 is also mounted between the bulk heads 107 and 108 adjacent the tube 115 and this includes a self-heating temperature-sensitive resistance element 128 on the tube in electrically insulated relation and good heat conducting relation thereto.

As can be seen in FIG. 10, a first set of bypass tubes 130 can be utilized adjacent the first sensing element 112. Bypass tubes 130 are open from the inlet chamber 110 to the transfer chamber 114.

A second set of bypass tubes 131 can also be inserted into the unit between the heat sinks 107 and 108 to permit fluid to flow from the transfer chamber 114 to the outlet chamber 116. The bypass tubes serve the same function as previously explained and permit the sensing or open tubes 112 and 115 to be very small diameter to insure laminar flow through these tubes. The bypass tubes are identical in construction to the open or sensing tubes.

A suitable conduit 132 can be used for carrying the leads from the resistance elements inside the sensor to position outside the case so that they can be connected to the desired circuitry.

FIG. 11 shows a simplified schematic diagram of a circuit used with the sensor of FIG. 9. As can be seen, the resistance elements 113 and 121 form one arm of the bridge circuit while the dummy resistance elements 124 and 128 form an adjacent arm. A pair of balance resistors 133 and 134 are connected to complete the bridge circuit. Voltage is applied to the input of the bridge from a voltage regulator 135. The voltage regulator 135 controls the amount of voltage coming from a source of EMF 136.

A control circuit 137 is controlled in turn by the control resistance element 126. The control circuit will regulate and adjust the voltage applied to the bridge from the voltage regulator in order to properly compensate the output of the bridge across a wide temperature range during operation of the sensor.

The output of the bridge is connected to a suitable indicating instrument shown schematically at 137 which will read directly the flow passing through the sensor.

By connecting the open tubes 112 and 115 in series the total amount of power dissipated in the active resistance elements can be doubled without increasing the voltage drop across each element. This will result in doubling the output signal under the same flow. More than two flow elements or tubes can be placed in series if desired to further increase the output signal of the bridge. The resistance elements on the tubes are also electrically connected in series to form a bridge arm and a corresponding number of resistance elements from the dummy tubes will also be electrically connected in series in an adjacent arm, as shown. The higher output signal level is useful under low flow rates but also can be used for all flow ranges.

Therefore, it can be seen that a self-heating temperature-sensitive element is used in each of the sensors on both the flow sensitive tube and the flow insensitive tube. This eliminates the need for having separate elements for heating the fluid and also eliminates the need for separate temperature sensing devices.

The tubes through which the fluid flows are small enough to insure laminar flow and thereby minimize the boundary layer effects. The usual size of these tubes for the normal flow range of the sensors is about .014" I.D. The thermal effect of this laminar flow condition is highly predictable and repeatable. In turbulent flow the boundary layer effect can vary widely so that repeatable results are not obtained. Further, substantially the entire cross section of the sample of the fluid flowing through the sensor is uniformly heated as it passes through the tube so that the amount of heat absorbed is a true function of the specific heat of the fluid being measured and the amount of mass flow. Small variations of the temperature of the fluid do not affect the sensor.

While the dummy element is shown as a tube, the dummy could be a solid member if it had identical heat transfer properties to the sensing tube.

The bypass tubes provided in the sensor are identical in construction in size to the sensing tube. This eliminates the effect of changing Reynolds number for different fluids, different viscosities and different flows and keeps the proportion of the total flow passing through the sensing tube the same.

The resistance elements are mounted onto the tubes in good heat conducting relationship thereto. The dual purpose heating and sensing function of the resistance elements simplifies the construction and operation of the sensor and greatly reduces any time lag present in previous sensors.

The sensor may be of all welded construction and there is no need for insulation sections in the tubes used in the elements as is necessary in some prior art device. The entire sensor can be made of stainless steel to insure long life and resistance to corrosive fluids.

Once the unit has been calibrated for a fluid the output can easily be calibrated for other fluids if the specific heat of the fluid is known.

The thermal mass flow is a function of the specific heat of the fluid.

What is claimed is:

1. A mass flow sensor comprising a first tubular element that passes fluid, a second element that does not change temperature as a result of fluid passing through said first element, means mounting said first and second elements in close thermal relationship at their mounting points, said first and second elements having third and fourth separate resistance elements mounted thereon in heat-conducting relationship thereto, respectively, said third resistance element comprising a resistance wire wrapped around the first tubular element so as to encircle the first tubular element, and electrical means connected to said resistance elements, said electrical means including means to pass a current through the resistance elements to cause said resistance elements to be heated, and means to compare the changes in resistance of said respective resistance elements when fluid is flowing through the first tubular element.

2. The combination as specified in claim 1 wherein the first tubular element is of such dimensions so that the flow therethrough is laminar.

3. The combination as specified in claim 1 wherein a plurality of first tubular elements are placed in series in fluid flow and each has a self-heating temperature-sensing element thereon, said electrical means being connected to give an increased signal indicating temperature differential directly proportional to the number of first elements in the sensor.

4. A mass flow sensor comprising an outer housing, a pair of bulk heads in said housing dividing said housing into a central portion, an inlet chamber and an outlet chamber, an inlet opening to said inlet chamber connected to a source of fluid to be measured and an outlet opening open from said outlet chamber, at least two sensing element assemblies sealingly mounted on said bulk heads, one of said element assemblies being open to permit flow from the inlet chamber to the outlet chamber, separate resistance elements mounted on each of said element assemblies in heat conducting relationship thereto, said resistance elements being substantially identical in resistance and relative location on said element assemblies, respectively, and circuit means connected to said resistance elements in a manner so that said separate resistance elements will dissipate heat therefrom, and means to indicate the temperature differential between said resistance elements.

5. The combination as specified in claim 4, a tubular member in each of said element assemblies and a separate outer tubular shield around said tubular members and closely spaced from the tubular members.

6. The combination as specified in claim 5 and relief valve means on the outlet to said sensor to maintain the pressure within said sensor above a predetermined minimum level.

7. A mass flow sensor including support means, a path for flow of fluid through at least one sensing element mounted on said support means, said sensing element comprising a first small diameter tube which is of such dimensions to insure laminar flow therethrough within the flow range of said sensor, a first self-heating temperature-responsive resistance element on said tube adjacent the inlet end thereof, a dummy element in said sensor, said dummy element comprising a second tube mounted in substantially the same relationship to the support means as said first tube, said second tube being blocked to prevent flow therethrough and having substantially identical heat transfer properties to said first tube, a second self-heating temperature-responsive resistance element mounted on said dummy element in heat conducting relationship thereto, said second resistance element being substantially the same resistance as and in a corresponding position to the first resistance element, and bridge circuit means including said resistance elements as adjacent arms of the bridge circuit, a source of EMF for supplying a voltage to said resistance elements to heat them equally, said first resistance element changing in resistance upon a drop in temperature due to fluid flow through said first tube thereby causing an output signal from the bridge proportional to the change in its resistance.

8. The combination as specified in claim 7 and separate convective shields around said first tube and said dummy element respectively said convective shields each being a shield tube of diameter less than one quarter inch greater than the first tube and dummy element, respectively.

9. The combination as specified in claim 8 and a third element on said support means, said third element having a temperature-sensitive resistance element thereon, said temperature sensitive resistance element being used to control the voltage supplied to said bridge circuit means.

10. The combination as specified in the claim 9 and a plurality of bypass tubes open to fluid flow from the inlet of said sensor to the outlet of said sensor, said bypass tubes being substantially identical in size and construction to the first tube.

11. A mass flow sensor comprising an outer case having an inlet and an outlet, a pair of spaced bulk heads in said case which act as heat sinks, a first tubular element that passes fluid in said case and mounted to and between said bulk heads, a second element that is not affected when fluid passes through said first element mounted to said bulk heads, the first and second elements being constructed to have substantially identical heat transfer to the bulk heads, said first and second elements having third and fourth separate self-heating thermal-sensing elements mounted thereon in heat conducting relationship thereto, respectively, and electrical means connected to said self-heating thermal-sensing elements, said electrical means including means to cause said self heating thermal sensing elements to be heated, and means to compare the temperature between said third and fourth elements.

12. The combination as specified in claim 11 wherein said self-heating thermal-sensing elements are resistance elements and are made of material that changes resistance with a change of temperature, and said electrical means includes a bridge circuit, said resistance elements forming adjacent arms of the bridge circuit.

13. The combination as specified in claim 11 and heat exchange means on said sensor comprising a pair of elongated concentric tubes of different diameters one of said tubes being open to a source of fluid and the inlet of said sensor and the other of said tubes being open to the outlet of said sensor.

References Cited

UNITED STATES PATENTS

| | | | |
|---|---|---|---|
| 3,251,225 | 5/1966 | Luft | 73—204 |
| 3,326,040 | 6/1967 | Walsh | 73—204 |
| 2,859,617 | 11/1958 | Adams | 73—204 |
| 3,081,628 | 3/1963 | Salera | 73—204 |

FOREIGN PATENTS

| | | |
|---|---|---|
| 712,351 | 7/1931 | France. |
| 1,238,716 | 7/1960 | France. |
| 861,337 | 2/1961 | Great Britain. |

RICHARD C. QUEISSER, *Primary Examiner.*

E. D. GILHOOLY, *Assistant Examiner.*

U.S. Cl. X.R.

330—22, 24, 28, 29, 35, 38